(12) United States Patent
Matuschek et al.

(10) Patent No.: US 8,757,703 B2
(45) Date of Patent: Jun. 24, 2014

(54) CAR BODY WITH A SHEAR ELEMENT ON ONE SIDE

(71) Applicant: GM Global Technology Operations LLC, Detroit, MI (US)

(72) Inventors: Jens Matuschek, Ruesselsheim (DE); Roland Schirmer, Frankfurt (DE); Andreas Woisnitza, Mainz (DE); Juergen Vollhardt, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/648,387

(22) Filed: Oct. 10, 2012

(65) Prior Publication Data

US 2013/0093211 A1    Apr. 18, 2013

(30) Foreign Application Priority Data

Oct. 11, 2011   (DE) .......................... 10 2011 115 587

(51) Int. Cl.
*B62D 21/15*   (2006.01)
*B62D 25/02*   (2006.01)

(52) U.S. Cl.
CPC ..................................... *B62D 25/02* (2013.01)
USPC ............. 296/187.12; 296/193.05; 296/187.05

(58) Field of Classification Search
CPC ...... B62D 21/157; B62D 21/15; B62D 25/02; B62D 25/025; B60R 19/34; B60R 21/04; B60R 21/0428; B60R 2021/0435; B60J 5/0458; F16F 7/00; F16F 7/003; F16F 7/125
USPC ............. 293/120, 126, 128, 102; 296/193.05, 296/193.07, 193.08, 193.09, 203.01, 204, 296/205, 203.02, 203.03, 203.04, 187.12, 296/187.05, 187.08, 187.04, 187.03, 187.1, 296/187.09; 280/784
See application file for complete search history.

(56) References Cited

U.S. PATENT DOCUMENTS

| | | | |
|---|---|---|---|
| 8,128,148 B2 | 3/2012 | Kober et al. | |
| 2007/0138840 A1* | 6/2007 | Caliskan et al. | 296/205 |
| 2008/0277967 A1* | 11/2008 | Gavrilov et al. | 296/187.05 |
| 2010/0090498 A1* | 4/2010 | Jungert et al. | 296/187.03 |
| 2010/0102577 A1* | 4/2010 | Ginja et al. | 293/102 |

FOREIGN PATENT DOCUMENTS

| | | |
|---|---|---|
| DE | 2936827 A1 | 4/1981 |
| DE | 10359483 A1 | 7/2005 |
| DE | 102005043707 A1 | 3/2007 |
| DE | 102010020533 A1 | 11/2011 |
| EP | 0941912 A1 | 9/1999 |
| WO | 2008022810 A1 | 2/2008 |

OTHER PUBLICATIONS

German Patent Office, German Search Report for German Application No. 102011115587.6 dated Jun. 5, 2012.

* cited by examiner

*Primary Examiner* — Joseph Pape
*Assistant Examiner* — Dana Ivey
(74) *Attorney, Agent, or Firm* — Ingrassia Fisher & Lorenz, P.C.

(57) ABSTRACT

A car body, for example, a front or rear frame is provided. The car body includes at least one crossmember and at least one pair of left and right braces that are arranged at least substantially symmetric to the crossmember. The car body also includes a shear element that is designed for absorbing shear forces during a collision and that is mounted on a brace of the pair, wherein no shear element is provided symmetrically thereto on the other brace of this pair.

17 Claims, 3 Drawing Sheets

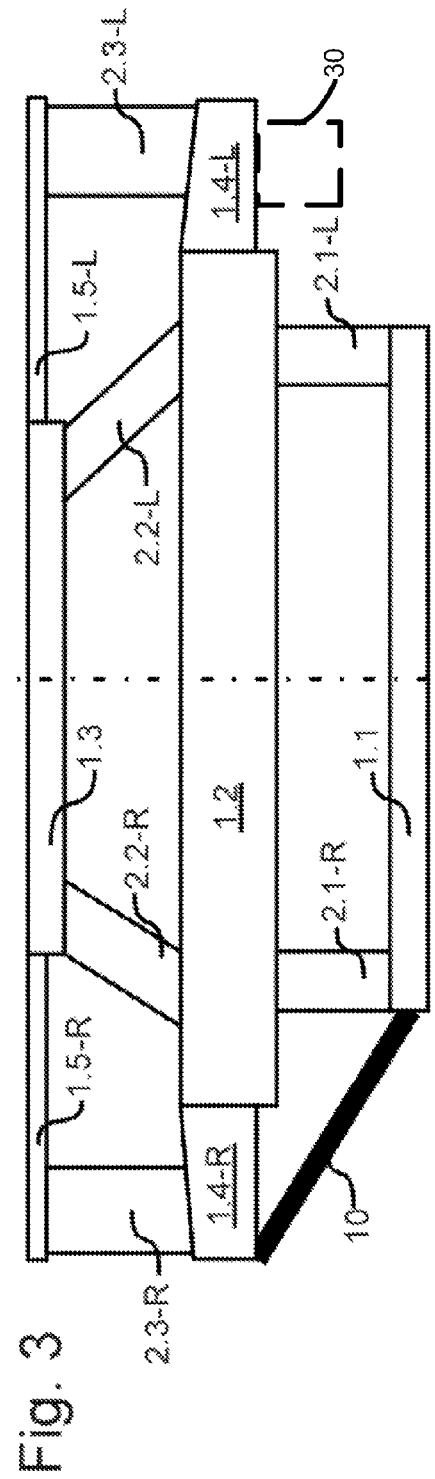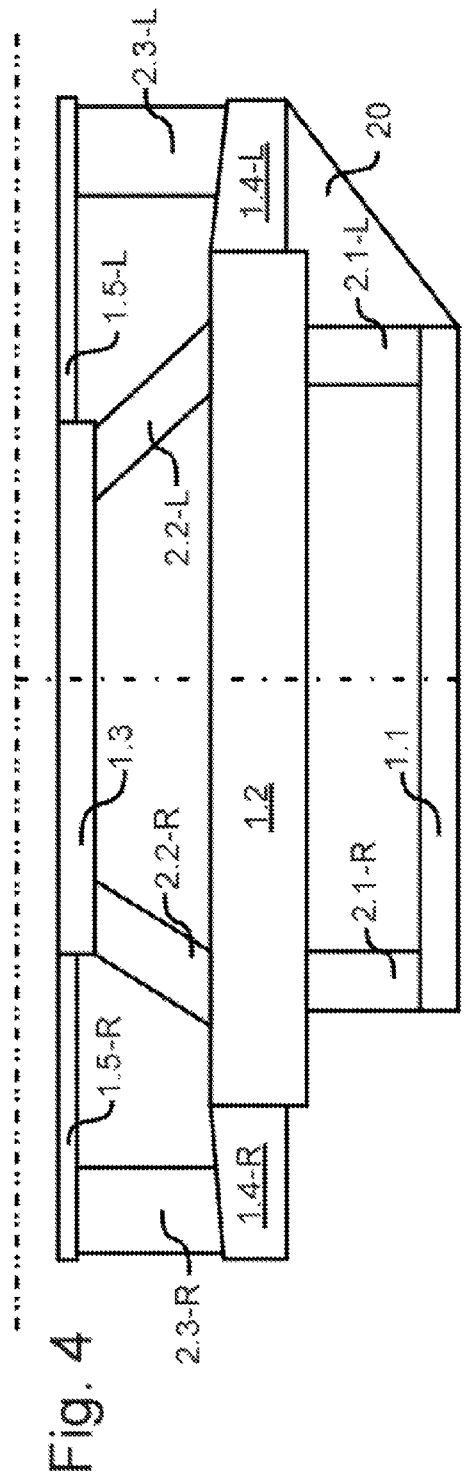

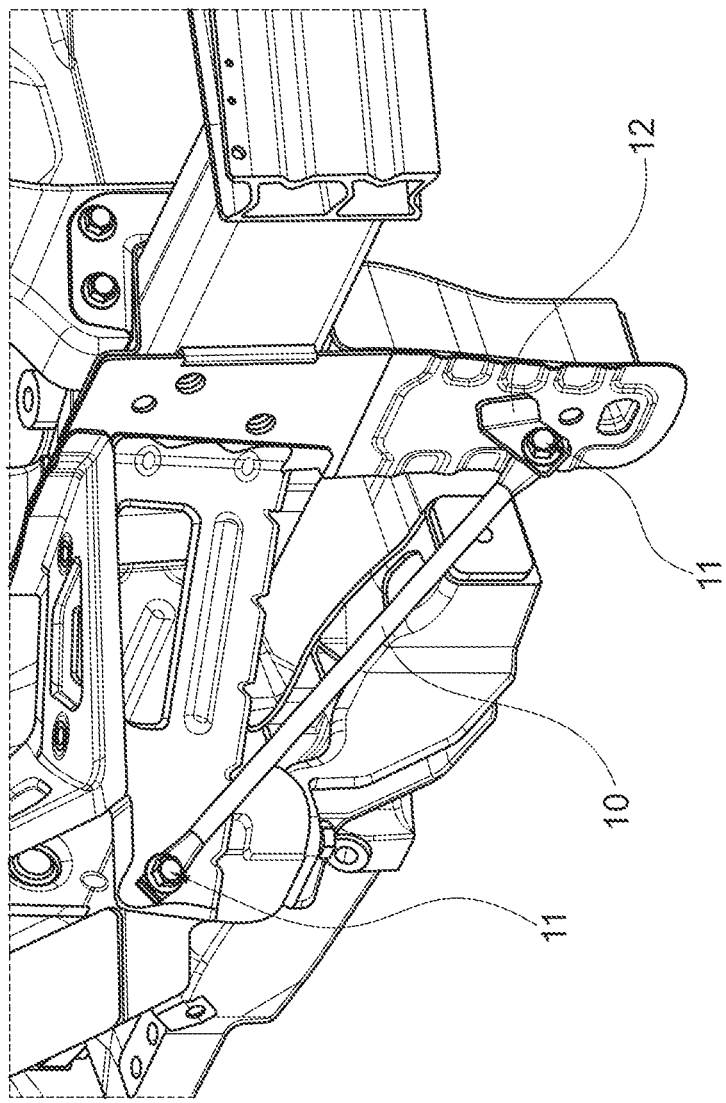

CAR BODY WITH A SHEAR ELEMENT ON ONE SIDE

CROSS-REFERENCE TO RELATED APPLICATION

This application claims priority to German Patent Application No. 10 2011 115 587.6, filed Oct. 11, 2011, which is incorporated herein by reference in its entirety.

TECHNICAL FIELD

The technical field pertains to a car body with a shear element on one side.

BACKGROUND

A front frame of a motor vehicle with a crossmember and a pair of left and right longitudinal braces that are arranged symmetric relative to the crossmember is known, for example, from DE 10 2005 043 707 A1. Nowadays, car bodies generally are at least partially symmetric along the plane of the longitudinal and the vertical vehicle axis.

In certain instances, such as during a collision with lateral components such as, e.g., the 10° load scenario according to the RCAR test protocol, in which a corner of the motor vehicle collides with a barrier that is inclined relative to the lateral vehicle axis by 10°, the forces introduced into the car body on one side in the collision area can lead to an asymmetric load distribution and consequently to a lateral displacement of car body elements, such as, the crossmembers.

In this context, FIG. 1 schematically shows a conventional car body with several crossmembers 1.1 to 1.5-L and several pairs of left (index "-L") and right (index "-R") braces 2.1 to 2.3, and FIG. 2 shows the car body after a collision with a barrier that is inclined relative to the lateral vehicle axis by 10°. The lateral loads and lateral displacements in the crossmembers are indicated with arrows and result in an expansion of the assemblage, particularly the asymmetric deformation of the car body.

Accordingly, it can be desirable to provide an improved car body. In addition, other objects, desirable features and characteristics will become apparent from the subsequent summary and detailed description, and the appended claims, taken in conjunction with the accompanying drawings and this background.

SUMMARY

According to one practice, shear plates are mounted on crossmembers and braces, wherein these shear plates absorb forces and reduce or prevent a lateral displacement and/or assemblage expansion. Since it cannot be predicted on which side of the vehicle a collision occurs and corresponding forces are introduced, shear plates of this type are symmetrically distributed such that, in pairs of left and right braces, the left as well as the right brace is respectively connected to the crossmember by means of a shear plate. However, this reduces the available structural space in the area of the car body, particularly when using plate-like shear elements. For example, if shear plates 20' are respectively arranged symmetrical or on both sides of the front frame according to FIG. 1 as indicated with broken lines in FIG. 1, the structural space in the front section of the car is restricted and therefore can no longer be used for accommodating a water reservoir, a horn, electronic components or the like.

According to one of various aspects of the present disclosure, provided is a one-sided shear element that is mounted on only one brace of a pair of left and right braces, which can significantly reduce the lateral displacement and assemblage expansion. Consequently, structural space for accommodating vehicle components such as water reservoirs, a horn or the like remains on the opposite side, on which no symmetrical shear element is provided.

According to another exemplary aspect of the present disclosure, a car body, for example, a front frame or rear frame, features one or more central crossmembers relative to, for example, the plane of the longitudinal and the vertical vehicle axis, as well as one or more pairs of left and right braces that are arranged at least substantially symmetric to such a crossmember. According to one of various exemplary embodiments, the braces may extend at least substantially in the longitudinal, the vertical and/or the lateral direction of the vehicle. In the context of the present disclosure, the crossmembers extend at least substantially in the lateral direction of the vehicle in one example, but may also be inclined relative to the lateral direction of the vehicle.

According to this exemplary aspect of the present disclosure, one or more shear elements are provided in order to absorb shear forces during a collision. In this case, one or more shear elements are arranged between the one brace of a pair of left and right braces and a crossmember and mounted on the brace and another car body element, for example, the crossmember, wherein no shear element is provided symmetrically thereto between the crossmember and the other brace of this pair.

In this way, structural space for vehicle components is cleared on the side of the other brace such that, according to one exemplary enhancement, one or more vehicle components such as water reservoirs, a horn or the like can be accommodated in the space between the other brace of a pair of left and right braces and the crossmember symmetric to the shear element that is mounted on the one brace of the pair. As mentioned above, the lateral displacement and the assemblage expansion can also be significantly reduced with this one-sided shear element.

One or more shear elements may be respectively arranged between a crossmember and a brace of a first pair of left and right braces that are arranged at least substantially symmetric to the crossmember and between the same or another crossmember and a brace of a second pair of left and right braces that are arranged at least substantially symmetric to this crossmember, wherein no shear element is provided symmetrically thereto between the respective crossmember and the respective other brace of the first and second pair. The one-sided shear elements of the first and second pair may be arranged on the same side of the vehicle or on opposite sides of the vehicle. Two or more shear elements may be additionally or alternatively arranged between a crossmember and one brace of a pair of left and right braces that are arranged at least substantially symmetric to this crossmember, wherein no shear element is provided symmetrical to one or more of these shear elements between the crossmember and the other brace of this pair. It would therefore be possible, for example, to provide one side of the vehicle with two shear elements while the other side of the vehicle is provided with only one shear element or no shear element at all. According to one exemplary embodiment, one or more shear elements are mounted on one brace of a pair of left and right braces and no shear element is provided between the crossmember and the other brace of this pair.

A shear element may be arranged on the left or the right side of the vehicle. It may extend in the longitudinal, the vertical and/or the lateral direction of the vehicle between the crossmember and one brace of the pair. According to one of various exemplary embodiments, it extends in the longitudinal, the vertical and the lateral direction of the vehicle and therefore is inclined relative to the longitudinal, the lateral and the vertical vehicle axis, i.e., it extends diagonal to a generally frame-like car body.

According to one exemplary embodiment, a shear element is realized in a rod-like or plate-like fashion. In comparison with a plate-like shear element or a frame-like or solid shear element, a rod-like shear element or a shear rod occupies less structural space, is able to adequately absorb and transmit forces in the (longitudinal) direction of rod and also has a lower weight. However, a plate-like shear element may have the advantage of being able to better absorb and transmit lateral forces and moments.

According to another exemplary embodiment, the shear element features a tubular center part, wherein a flattening for respectively mounting the shear element on the crossmember and one brace of the pair is realized on one or both end faces of the center part. Such a shear element can be easily manufactured and mounted and has a low weight. A bore may be arranged in a flattening in order to screw down the shear element.

According to another exemplary embodiment, the shear element is permanently mounted on the crossmember and/or one brace of the pair. It may be mounted, for example, by means of welding, soldering, bonding, riveting and/or caulking. This advantageously makes it possible to produce a permanent connection that is less sensitive to vibrations. A shear element may likewise be separably mounted on the crossmember and/or one brace of the pair. In this case, it may be mounted, for example, by means of screws. This simplifies the mounting of the shear element, as well as its replacement, e.g., in case of a defect.

According to another exemplary embodiment, the shear element is rigidly mounted on the crossmember and/or one brace of the pair in order to enable the shear element to also transmit moments. It may likewise be mounted on the crossmember and/or one brace of the pair in an articulated fashion in order to compensate, for example, distortions of the car body.

According to another exemplary embodiment, the crossmember and/or the one brace feature a holding bracket for mounting the shear element. This makes it possible to compensate for an offset between, for example, the orientation of the mounting surfaces on the crossmember and on the brace.

A shear element therefore may be directly or indirectly mounted on a brace and/or a crossmember. It would be possible, for example, to arrange at least one additional brace that extends in the longitudinal, vertical and/or lateral direction of the vehicle between a crossmember and a shear element such that the shear element is indirectly mounted on the crossmember by means of this (these) additional brace(s). In the context of the present disclosure, an arrangement of a shear element between a brace and a crossmember generally refers, for example, to an arrangement in the force flow such that the shear element transmits tensile, compressive and/or lateral forces and/or bending moments and/or torsional moments between the crossmember and the brace. In the context of the present disclosure, an arrangement of a shear element between a brace and a crossmember likewise refers, for example, to the shear element spatially bordering on the brace and the crossmember, wherein at least one additional brace may also be intermediately arranged between the crossmember and the shear element as described above. In the context of the present disclosure, an arrangement between a brace and a crossmember furthermore refers, for example, to an arrangement in a space that is at least partially defined by the brace and the crossmember.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 3 shows a car body according to an exemplary embodiment of the present disclosure in the form of an illustration that corresponds to that in FIG. 1;

FIG. 4 shows the car body according to another exemplary embodiment of the present disclosure in the form of an illustration that corresponds to that in FIG. 3; and FIG. 5 shows part of the car body according to FIG. 3 in the form of a perspective view.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
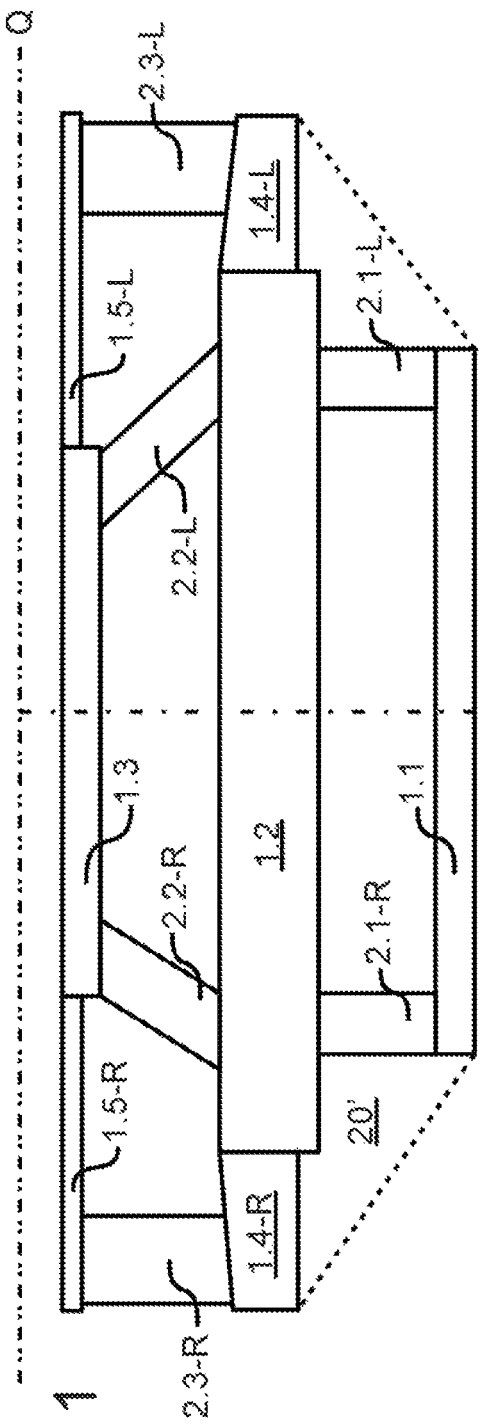
FIG. 1 shows a conventional car body.

As initially mentioned, FIG. 1 shows a conventional car body with three central crossmembers 1.1 to 1.3 and two pairs of left and right crossmembers 1.4-L, 1.4-R and 1.5-L, 1.5-R. The car body furthermore features three pairs of left and right braces 2.1-L and 2.1-R, 2.2-L and 2.2-R, as well as 2.3-L and 2.3-R. These braces may respectively extend in the longitudinal and/or vertical direction of the vehicle such that FIG. 1 may represent a front view in the longitudinal direction of the vehicle or a top view in the vertical direction of the vehicle. Accordingly, the reference symbol "A" identifies a longitudinal or vertical vehicle axis that is illustrated in the form of a dot-dash line. In this context, it should be emphasized that the schematically indicated braces may also extend in the lateral direction of the vehicle that is indicated in the form of a dot-dot-dash line in FIG. 1 and identified by the reference symbol "Q." The pairs of left and right crossmembers 1.4-L, 1.4-R and 1.5-L, 1.5-R, for example, accordingly could also be interpreted as pairs of left and right braces in the context of the present disclosure.

Figure 2:
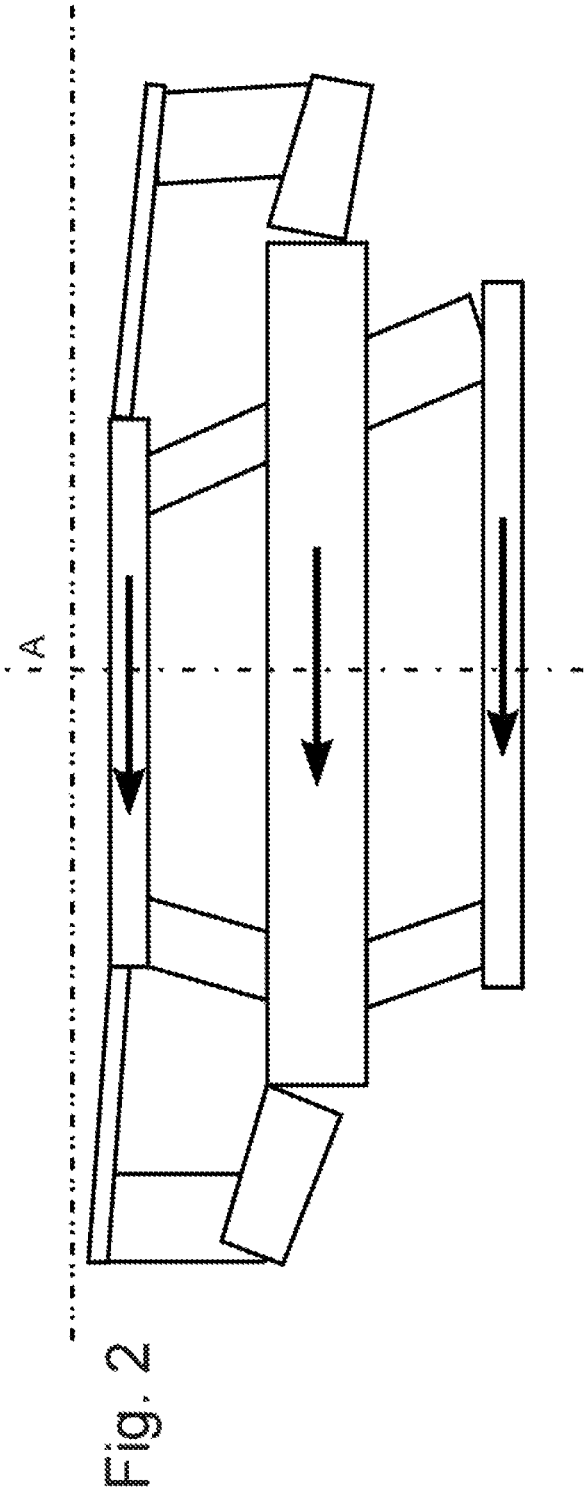
FIG. 2 shows the car body according to FIG. 1 during a 10° load scenario.

As initially mentioned, FIG. 2 shows the car body according to FIG. 1 during a 10° load scenario. The arrows indicate lateral displacements of car body elements in the lateral direction of the vehicle Q and the expansion of the assemblage. The structural space for other vehicle components would be significantly restricted if plate-like shear elements 20' would be arranged on both sides as indicated in FIG. 1.

In the car body according to an exemplary embodiment of the present disclosure that is illustrated in FIG. 3, a shear rod 10 consequently is arranged on one side between the right crossmember 1.4-R and the right brace 2.1-R or the crossmember 1.1, respectively, while no shear rod is provided symmetrically thereto, i.e., in the lower right corner of FIG. 3. In this way, structural space for accommodating a water reservoir, horn and/or other vehicle components, collectively and/or individually schematically represented by structure 30 in FIG. 3, is made available at this location while the one-sided shear rod 10 simultaneously reduces a lateral displacement and assemblage expansion during an offset collision such as, e.g., the 10° load scenario according to RCAR. In other respects, the design corresponds to the embodiment according to FIG. 1, wherein corresponding elements are identified by identical reference symbols such that only the differences between these embodiments are discussed. The frame in FIG. 3 may be a front frame or a rear frame, depending on perspective, with crossmember 1.4 being interior to crossmember 1.1.

FIG. 4 shows a car body according to another exemplary embodiment of the present disclosure in the form of an illustration that corresponds to that in FIG. 3, wherein corresponding elements are once again identified by identical reference symbols such that only the differences between these exemplary embodiments are discussed.

In the exemplary embodiment according to FIG. 4, a one-sided shear element 20 realized in a plate-like fashion is arranged on the other, left side of the vehicle (on the right in FIG. 4). This shear element can absorb moments in a superior fashion. On the other side, a shear element with a rod-like design, e.g., of the type used in the exemplary embodiment according to FIG. 3 may make it possible to also accommodate (not-shown) smaller vehicle components, for example, electronic components, at this location.

FIG. 5 shows part of the car body according to FIG. 3 in the form of a perspective view. This figure shows the shear rod 10 that extends in the longitudinal, lateral and vertical direction of the vehicle, i.e., diagonally. It features a tubular center part, both sides of which transform into a flattening with a through-bore arranged therein. Screws 11 that are respectively screwed to the brace and the crossmember directly or by means of a holding bracket 12 extend through these through-bores. The holding bracket 12 compensates the offset between the orientations of the two car body mounting surfaces for the shear rod 10 and is generally welded or bonded to the car body.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A car body, comprising:
a first crossmember;
a second crossmember, interior to the first crossmember;
at least one pair of first and second braces extending between the first crossmember and the second crossmember, the at least one pair of first and second braces being arranged at least substantially symmetric to the second crossmember; and
a shear element that absorbs shear forces during a collision, the shear element extending between the second crossmember and at least one of the first crossmember or the first brace,
wherein the shear element is arranged asymmetrically with respect to a longitudinal axis of the car body.

2. The car body according to claim 1, wherein at least one vehicle component is accommodated in a space between the crossmember and the other brace.

3. The car body according to claim 2, wherein the at least one vehicle component is at least one of a fluid reservoir and a horn.

4. The car body according to claim 1, wherein the shear element is arranged on a left side or a right side of the car body and extends in at least one of the longitudinal, vertical and lateral direction of the car body.

5. The car body according to claim 1, wherein the shear element comprises at least one of a rod or a plate.

6. The car body according to claim 5, wherein the shear element comprises a tubular center part with a flattened end face for mounting purposes.

7. The car body according to claim 1, wherein the shear element extends between the second crossmember and the first brace.

8. The car body according to claim 1, further comprising a screw mounting the shear element to the at least one of the first crossmember or the first brace.

9. The car body according to claim 1, wherein the shear element is rigidly mounted on the at least one of the first crossmember or the first brace.

10. The car body according to claim 1, further comprising a holding bracket mounting the shear element to the at least one of the first crossmember or the first brace.

11. The car body according to claim 1, wherein the shear element is arranged on a front of a front frame or on a rear of a rear frame.

12. A motor vehicle comprising:
a rear frame having a first crossmember, a second crossmember interior to the first crossmember, and at least one pair of first and second braces extending between the first crossmember and the second crossmember, the at least one pair of first and second braces being arranged at least substantially symmetric to the second crossmember, the rear frame including a shear element that absorbs shear forces during a collision that extends between the second crossmember and the first brace and extends in at least one of the longitudinal, vertical and lateral direction of the motor vehicle,
wherein the shear element is a single shear element of the car body such that the shear element is arranged asymmetrically with respect to the first and second braces.

13. The motor vehicle according to claim 12, wherein the shear element comprises at least one of a rod or a plate.

14. The motor vehicle according to claim 13, wherein the shear element features comprises a tubular center part with a flattened end face for mounting purposes.

15. The motor vehicle according to claim 12, further comprising a screw mounting the shear element to the first brace.

16. The motor vehicle according to claim 12, wherein the shear element is rigidly mounted on the first brace.

17. The motor vehicle according to claim 12, further comprising a holding bracket mounting the shear element to the first brace.

* * * * *